(12) United States Patent
Seng et al.

(10) Patent No.: US 12,444,068 B2
(45) Date of Patent: Oct. 14, 2025

(54) OPTICAL INSPECTION BASED ON REPETITIVE FEATURE COMPARISON

(71) Applicant: LG INNOTEK CO., LTD., Seoul (KR)

(72) Inventors: Frederick Seng, Cranbury, NJ (US); Harold Hwang, Cranbury, NJ (US); Brian Piccione, Cranbury, NJ (US); Kuen-Ting Shiu, Cranbury, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 541 days.

(21) Appl. No.: 17/878,760

(22) Filed: Aug. 1, 2022

(65) Prior Publication Data

US 2024/0037768 A1    Feb. 1, 2024

(51) Int. Cl.
  *G06T 7/00* (2017.01)
  *G06T 7/564* (2017.01)

(52) U.S. Cl.
  CPC .... *G06T 7/564* (2017.01); *G06T 2207/20081* (2013.01); *G06T 2207/20084* (2013.01)

(58) Field of Classification Search
  CPC .......... G06T 7/564; G06T 2207/20081; G06T 2207/20084; G06T 2207/30164; G06T 7/12; G06T 2207/10024; G06T 7/0004
  See application file for complete search history.

(56) References Cited

U.S. PATENT DOCUMENTS

| 5,892,575 A | 4/1999 | Marino |
| 7,544,945 B2 | 6/2009 | Tan et al. |
| 7,858,917 B2 | 12/2010 | Stern et al. |
| 7,969,558 B2 | 6/2011 | Hall |
| 8,093,624 B1 | 1/2012 | Renzi et al. |

(Continued)

FOREIGN PATENT DOCUMENTS

| CN | 110114694 A | 8/2019 |
| CN | 113052829 A | 6/2021 |

(Continued)

OTHER PUBLICATIONS

Czimmermann, T., Ciuti, G., Milazzo, M., Chiurazzi, M., Roccella, S., Oddo, C.M. & Dario, P., "Visual-Based Defect Detection and Classification Approaches for Industrial Applications—A Survey," Sensors. 2020; 20(5):1459; 25 pages.

(Continued)

*Primary Examiner* — Van D Huynh
(74) *Attorney, Agent, or Firm* — Birch, Stewart, Kolasch & Birch, LLP

(57) ABSTRACT

A computer-based system may quantify, based on the plurality of instances of a feature indicated by image data, an attribute (e.g., a color, a shape, a material, a texture, etc.) of the plurality of instances of the feature. The system may also quantify an attribute of an instance of the feature of the plurality of instances of the feature. The system may modify the image data to indicate the instance of the feature if/when a value of the quantified attribute of the instance of the feature exceeds a value of the quantified attribute of the plurality of instances of the feature by a threshold. Functionality (e.g., defective, non-defective, potentially defective, etc.) of the unit may be classified based on the modified image data.

17 Claims, 6 Drawing Sheets

(56) References Cited

U.S. PATENT DOCUMENTS

| | | |
|---|---|---|
| 8,106,422 B2 | 1/2012 | Veliadis |
| 8,159,680 B2 | 4/2012 | Robinson et al. |
| 8,426,797 B2 | 4/2013 | Aull et al. |
| 8,599,367 B2 | 12/2013 | Canham |
| 8,710,424 B2 | 4/2014 | Shaver et al. |
| 8,767,190 B2 | 7/2014 | Hall |
| 8,836,922 B1 | 9/2014 | Pennecot et al. |
| 9,063,549 B1 | 6/2015 | Pennecot et al. |
| 9,069,060 B1 | 6/2015 | Zbrozek et al. |
| 9,069,061 B1 | 6/2015 | Harwit |
| 9,086,273 B1 | 7/2015 | Gruver et al. |
| 9,285,464 B2 | 3/2016 | Pennecot et al. |
| 9,299,731 B1 | 3/2016 | Lenius et al. |
| 9,304,203 B1 | 4/2016 | Droz et al. |
| 9,575,184 B2 | 2/2017 | Gilliland et al. |
| 9,625,580 B2 | 4/2017 | Kotelnikov et al. |
| 9,696,722 B1 | 7/2017 | Ulrich et al. |
| 9,804,264 B2 | 10/2017 | Villeneuve et al. |
| 9,810,775 B1 | 11/2017 | Welford et al. |
| 9,810,786 B1 | 11/2017 | Welford et al. |
| 9,812,838 B2 | 11/2017 | Villeneuve et al. |
| 9,831,630 B2 | 11/2017 | Lipson |
| RE46,672 E | 1/2018 | Hall |
| 9,857,468 B1 | 1/2018 | Eichenholz et al. |
| 9,874,635 B1 | 1/2018 | Eichenholz et al. |
| 9,880,263 B2 | 1/2018 | Droz et al. |
| 9,899,544 B1 | 2/2018 | Mazzillo et al. |
| 9,911,774 B2 | 3/2018 | Grzesik |
| 9,958,545 B2 | 5/2018 | Eichenholz et al. |
| 9,983,297 B2 | 5/2018 | Hall et al. |
| 10,003,168 B1 | 6/2018 | Villeneuve |
| 10,007,000 B1 | 6/2018 | Droz et al. |
| 10,012,732 B2 | 7/2018 | Eichenholz et al. |
| 10,018,505 B2 | 7/2018 | Clemens et al. |
| 10,018,725 B2 | 7/2018 | Liu |
| 10,018,726 B2 | 7/2018 | Hall et al. |
| 10,031,214 B2 | 7/2018 | Rosenzweig et al. |
| 10,031,232 B2 | 7/2018 | Zohar et al. |
| 10,061,019 B1 | 8/2018 | Campbell et al. |
| 10,063,849 B2 | 8/2018 | Pacala et al. |
| 10,094,925 B1 | 10/2018 | LaChapelle |
| 10,107,915 B2 | 10/2018 | Rosenzweig et al. |
| 10,109,671 B2 | 10/2018 | Donnelly et al. |
| 10,121,813 B2 | 11/2018 | Eichenholz et al. |
| 10,126,411 B2 | 11/2018 | Gilliland et al. |
| 10,126,426 B2 | 11/2018 | Haslim et al. |
| 10,177,181 B2 | 1/2019 | Grzesik |
| 10,191,155 B2 | 1/2019 | Curatu |
| 10,191,156 B2 | 1/2019 | Steinberg et al. |
| 10,205,036 B2 | 2/2019 | Mazzillo et al. |
| 10,211,592 B1 | 2/2019 | Villeneuve et al. |
| 10,211,593 B1 | 2/2019 | Lingvay et al. |
| 10,215,859 B2 | 2/2019 | Steinberg et al. |
| 10,222,477 B2 | 3/2019 | Keilaf et al. |
| 10,234,546 B2 | 3/2019 | Droz et al. |
| 10,241,207 B2 | 3/2019 | Rosenzweig et al. |
| 10,241,208 B2 | 3/2019 | Osiroff et al. |
| 10,243,544 B1 | 3/2019 | Gutnik |
| 10,247,811 B2 | 4/2019 | Clifton |
| 10,261,389 B2 | 4/2019 | Skirlo et al. |
| 10,274,599 B2 | 4/2019 | Schmalenberg |
| 10,277,007 B1 | 4/2019 | Lenius et al. |
| 10,281,582 B2 | 5/2019 | Elooz et al. |
| 10,310,088 B2 | 6/2019 | Elooz et al. |
| 10,317,534 B2 | 6/2019 | Eshel et al. |
| 10,324,170 B1 | 6/2019 | Engberg, Jr. et al. |
| 10,324,185 B2 | 6/2019 | McWhirter et al. |
| 10,330,780 B2 | 6/2019 | Hall et al. |
| 10,340,651 B1 | 7/2019 | Drummer et al. |
| 10,353,075 B2 | 7/2019 | Buskila et al. |
| 10,361,334 B2 | 7/2019 | McIntosh et al. |
| 10,379,540 B2 | 8/2019 | Droz et al. |
| 10,386,465 B2 | 8/2019 | Hall et al. |
| 10,386,488 B2 | 8/2019 | Ridderbusch |
| 10,393,877 B2 | 8/2019 | Hall et al. |
| 10,523,880 B2 | 12/2019 | Gassend et al. |
| 10,539,661 B2 | 1/2020 | Hall et al. |
| RE47,942 E | 4/2020 | Hall |
| 10,612,972 B2 | 4/2020 | Clemens et al. |
| 10,663,586 B2 | 5/2020 | Pacala et al. |
| RE48,042 E | 6/2020 | Pennecot et al. |
| 10,700,220 B2 | 6/2020 | Mazzillo et al. |
| 10,788,571 B2 | 9/2020 | Ingram et al. |
| 10,845,466 B2 | 11/2020 | Pei et al. |
| 10,939,057 B2 | 3/2021 | Gassend et al. |
| 10,951,864 B2 | 3/2021 | Droz et al. |
| 2002/0168099 A1* | 11/2002 | Noy ................ G01N 21/95607 382/149 |
| 2004/0120571 A1* | 6/2004 | Duvdevani .......... G06V 10/469 382/149 |
| 2005/0169646 A1 | 8/2005 | Bondurant et al. |
| 2014/0233844 A1* | 8/2014 | Amzaleg ................ G06T 7/001 382/149 |
| 2015/0051860 A1* | 2/2015 | Zuo ...................... G01N 21/956 702/82 |
| 2015/0278597 A1* | 10/2015 | Amzaleg ................ G06T 7/001 382/149 |
| 2016/0293858 A1 | 10/2016 | Brandt et al. |
| 2017/0082733 A1 | 3/2017 | Schwarz |
| 2017/0090032 A1 | 3/2017 | Ridderbusch |
| 2017/0138866 A1* | 5/2017 | Huang ............... G01N 21/9501 |
| 2017/0146640 A1 | 5/2017 | Hall et al. |
| 2017/0153319 A1 | 6/2017 | Villeneuve et al. |
| 2017/0155225 A1 | 6/2017 | Villeneuve et al. |
| 2017/0219695 A1 | 8/2017 | Hall et al. |
| 2018/0024246 A1 | 1/2018 | Jeong et al. |
| 2018/0031678 A1 | 2/2018 | Singer et al. |
| 2018/0031680 A1 | 2/2018 | Lee et al. |
| 2018/0052378 A1 | 2/2018 | Shin et al. |
| 2018/0059223 A1 | 3/2018 | Jeong et al. |
| 2018/0059444 A1 | 3/2018 | Lee et al. |
| 2018/0069367 A1 | 3/2018 | Villeneuve et al. |
| 2018/0106900 A1 | 4/2018 | Droz et al. |
| 2018/0128904 A1 | 5/2018 | Haslim |
| 2018/0128920 A1 | 5/2018 | Keilaf et al. |
| 2018/0143308 A1 | 5/2018 | Vlaiko et al. |
| 2018/0149732 A1 | 5/2018 | Droz et al. |
| 2018/0164408 A1 | 6/2018 | Hall et al. |
| 2018/0164410 A1 | 6/2018 | Gnecchi et al. |
| 2018/0164412 A1 | 6/2018 | Gnecchi et al. |
| 2018/0164440 A1 | 6/2018 | Fried et al. |
| 2018/0172829 A1 | 6/2018 | Holleczek et al. |
| 2018/0172832 A1 | 6/2018 | Holleczek et al. |
| 2018/0188359 A1 | 7/2018 | Droz et al. |
| 2018/0196137 A1 | 7/2018 | Lee et al. |
| 2018/0196138 A1 | 7/2018 | Lee et al. |
| 2018/0259625 A1 | 9/2018 | Gnecchi et al. |
| 2018/0261975 A1 | 9/2018 | Pavlov et al. |
| 2018/0267148 A1 | 9/2018 | Buettner et al. |
| 2018/0269646 A1 | 9/2018 | Welford et al. |
| 2018/0284228 A1 | 10/2018 | LaChapelle |
| 2018/0284237 A1 | 10/2018 | Campbell et al. |
| 2018/0284239 A1 | 10/2018 | LaChapelle et al. |
| 2018/0284240 A1 | 10/2018 | LaChapelle et al. |
| 2018/0284241 A1 | 10/2018 | Campbell et al. |
| 2018/0284242 A1 | 10/2018 | Campbell |
| 2018/0284276 A1 | 10/2018 | Campbell |
| 2018/0284286 A1 | 10/2018 | Eichenholz et al. |
| 2018/0306927 A1 | 10/2018 | Slutsky et al. |
| 2018/0314131 A1 | 11/2018 | Pant et al. |
| 2018/0329037 A1 | 11/2018 | Bozchalooi et al. |
| 2018/0348348 A1 | 12/2018 | Holleczek et al. |
| 2018/0356502 A1 | 12/2018 | Hinderling et al. |
| 2018/0364334 A1 | 12/2018 | Xiang et al. |
| 2018/0364337 A1 | 12/2018 | Wilton |
| 2018/0364356 A1 | 12/2018 | Eichenholz et al. |
| 2018/0372845 A1 | 12/2018 | Kaestner et al. |
| 2018/0372850 A1 | 12/2018 | Frederiksen et al. |
| 2018/0372874 A1 | 12/2018 | Lipson et al. |
| 2018/0373117 A1 | 12/2018 | Jeong |
| 2018/0373253 A1 | 12/2018 | Lipson et al. |
| 2019/0004394 A1 | 1/2019 | Shin et al. |
| 2019/0033460 A1 | 1/2019 | Lipson |
| 2019/0041498 A1 | 2/2019 | Droz et al. |

(56) References Cited

U.S. PATENT DOCUMENTS

| | | |
|---|---|---|
| 2019/0041520 A1 | 2/2019 | Ramsteiner et al. |
| 2019/0041865 A1 | 2/2019 | Lipson et al. |
| 2019/0052844 A1 | 2/2019 | Droz et al. |
| 2019/0064323 A1 | 2/2019 | Mayer et al. |
| 2019/0064331 A1 | 2/2019 | Russell et al. |
| 2019/0064332 A1 | 2/2019 | Schmalenberg et al. |
| 2019/0064355 A1 | 2/2019 | Pacala et al. |
| 2019/0064356 A1 | 2/2019 | Yoon et al. |
| 2019/0064554 A1 | 2/2019 | Dede et al. |
| 2019/0079224 A1 | 3/2019 | Fiess et al. |
| 2019/0094345 A1 | 3/2019 | Singer et al. |
| 2019/0094346 A1 | 3/2019 | Dumoulin et al. |
| 2019/0094366 A1 | 3/2019 | Maleki et al. |
| 2019/0101626 A1 | 4/2019 | Gilliland et al. |
| 2019/0107623 A1 | 4/2019 | Campbell et al. |
| 2019/0131480 A1 | 5/2019 | Singh et al. |
| 2019/0146060 A1 | 5/2019 | Qiu et al. |
| 2019/0154832 A1 | 5/2019 | Maleki et al. |
| 2019/0157491 A1 | 5/2019 | Jo et al. |
| 2019/0162823 A1 | 5/2019 | Eckstein et al. |
| 2019/0170875 A1 | 6/2019 | Schmalenberg et al. |
| 2019/0178992 A1 | 6/2019 | Hall et al. |
| 2019/0212454 A1 | 7/2019 | Petit |
| 2019/0219676 A1 | 7/2019 | Frederiksen et al. |
| 2019/0221988 A1 | 7/2019 | Villeneuve et al. |
| 2019/0227148 A1 | 7/2019 | Frederiksen et al. |
| 2019/0227175 A1 | 7/2019 | Steinberg et al. |
| 2019/0235084 A1 | 8/2019 | Heussner et al. |
| 2019/0244336 A1* | 8/2019 | Wakisaka .......... G01N 21/88 |
| 2019/0285732 A1 | 9/2019 | Ratterath et al. |
| 2020/0044098 A1 | 2/2020 | Azuma et al. |
| 2020/0076152 A1 | 3/2020 | Eichenholz et al. |
| 2020/0119522 A1 | 4/2020 | Burroughs et al. |
| 2020/0142421 A1 | 5/2020 | Palanisamy et al. |
| 2020/0370954 A1 | 11/2020 | Fujita et al. |
| 2021/0271158 A1 | 9/2021 | Smits |
| 2021/0334953 A1 | 10/2021 | Seki |
| 2021/0356319 A1 | 11/2021 | Fujita et al. |
| 2021/0408089 A1 | 12/2021 | Itzler et al. |
| 2022/0215524 A1* | 7/2022 | Hirano .......... G01N 21/956 |
| 2024/0160194 A1* | 5/2024 | Bakhshmand .......... G06N 20/10 |

FOREIGN PATENT DOCUMENTS

| | | |
|---|---|---|
| CN | 113673533 A | 11/2021 |
| EP | 3 296 764 A1 | 3/2018 |
| EP | 3 394 637 A1 | 10/2018 |
| EP | 3 394 638 A1 | 10/2018 |
| EP | 3 497 413 A1 | 6/2019 |
| EP | 3 516 421 A2 | 7/2019 |
| EP | 3 529 571 A1 | 8/2019 |
| EP | 3 529 634 A1 | 8/2019 |
| WO | WO 2016/167753 A1 | 10/2016 |
| WO | WO 2017/091810 A1 | 6/2017 |
| WO | WO 2018/016689 A1 | 1/2018 |
| WO | WO 2018/055513 A2 | 3/2018 |
| WO | WO 2018/067158 A1 | 4/2018 |
| WO | WO 2018/075358 A1 | 4/2018 |
| WO | WO 2018/088991 A1 | 5/2018 |
| WO | WO 2018/108981 A1 | 6/2018 |
| WO | WO 2018/156877 A1 | 8/2018 |
| WO | WO 2018/162456 A1 | 9/2018 |
| WO | WO 2018/162632 A1 | 9/2018 |
| WO | WO 2018/183715 A1 | 10/2018 |
| WO | WO 2018/208843 A1 | 11/2018 |
| WO | WO 2018/209073 A1 | 11/2018 |
| WO | WO 2018/237271 A1 | 12/2018 |
| WO | WO 2019/009955 A1 | 1/2019 |
| WO | WO 2019/010320 A1 | 1/2019 |
| WO | WO 2019/042926 A1 | 3/2019 |
| WO | WO 2019/046581 A1 | 3/2019 |
| WO | WO 2019/050643 A1 | 3/2019 |
| WO | WO 2019/055691 A1 | 3/2019 |
| WO | WO 2019/064062 A1 | 4/2019 |
| WO | WO 2019/076337 A1 | 4/2019 |
| WO | WO 2019/079532 A1 | 4/2019 |
| WO | WO 2019/079797 A1 | 4/2019 |
| WO | WO 2019/088974 A1 | 5/2019 |
| WO | WO 2019/135809 A2 | 7/2019 |
| WO | WO 2019/146725 A1 | 8/2019 |
| WO | WO 2019/223858 A1 | 11/2019 |
| WO | WO 2020/083661 A1 | 4/2020 |
| WO | WO 2020/127335 A1 | 6/2020 |
| WO | WO 2020/251787 A2 | 12/2020 |
| WO | WO 2021/235364 A1 | 11/2021 |
| WO | WO 2022/019018 A1 | 1/2022 |

OTHER PUBLICATIONS

Maddikunta, P. K. R., Hakak, S., Alazab, M., Bhattacharya, S., Gadekallu, T. R., Khan, W. Z. & Pham, Q.-V, "Unmanned Aerial Vehicles in Smart Agriculture: Applications, Requirements, and Challenges," in IEEE Sensors Journal, vol. 21, No. 16, Aug. 15, 2021, pp. 17608-17619.

* cited by examiner

OPTICAL INSPECTION BASED ON REPETITIVE FEATURE COMPARISON

BACKGROUND

Conventional optical inspection techniques require golden sample image comparison where a trained machine learning model compares an image of a unit under inspection to an image depicting a model and/or non-defective unit (e.g., a golden sample, etc.) to identify detects on or affecting the unit under inspection. Conventional optical inspection techniques, including machine learning-based inspection techniques, are effective in situations such as mass-production processes where the design and/or fabrication process of inspected units are pre-set and thus an image depicting a model and/or non-defective unit (e.g., a golden sample, etc.) may be pre-readied for application.

However, conventional optical inspection techniques are ineffective in situations such as custom or unique production processes where the design and/or fabrication process of inspected units are unable to be pre-set, and thus an image depicting a model and/or non-defective unit (e.g., a golden sample, etc.) is unavailable. In other words, conventional optical inspection techniques are not ideal for inspection operations that include constantly changing large quantity development process runs due to the consistently changing nature of units under inspection. Conventional optical inspection techniques are not self-contained to the unit under inspection such that variations from developmental run to run will not require significant support (e.g., preparing a golden sample, etc.). Rather, conventional optical inspection techniques require a machine learning model to be pre-trained on multiple labeled datasets, evaluated for accuracy, and calibrated to address any errors in forecasting—an error-prone, time-consuming, and costly endeavor.

SUMMARY

A computer-based system, for example, performing automated optical inspection, may identify a plurality of instances of a feature in image data (e.g., a single high-resolution image, etc.) for a unit under inspection, such as a photodetector array, laser diode array, and/or any other device/component. The system may quantify, based on the plurality of instances of the feature, an attribute (e.g., a color, a shape, a material, a texture, etc.) of the plurality of instances of the feature. The system may also quantify, for each instance of the feature of the plurality of instances of the feature, a respective attribute of the instance of the feature. The system may modify the image data to indicate each instance of the feature with a value of the respective quantified attribute that exceeds a value of the quantified attribute of the plurality of instances of the feature by a threshold. According to some aspects, the system may classify the functionality (e.g., defective, non-defective, potentially detective, etc.) of the unit under inspection (e.g., indicated by the image data, etc.) based on the modified image data.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
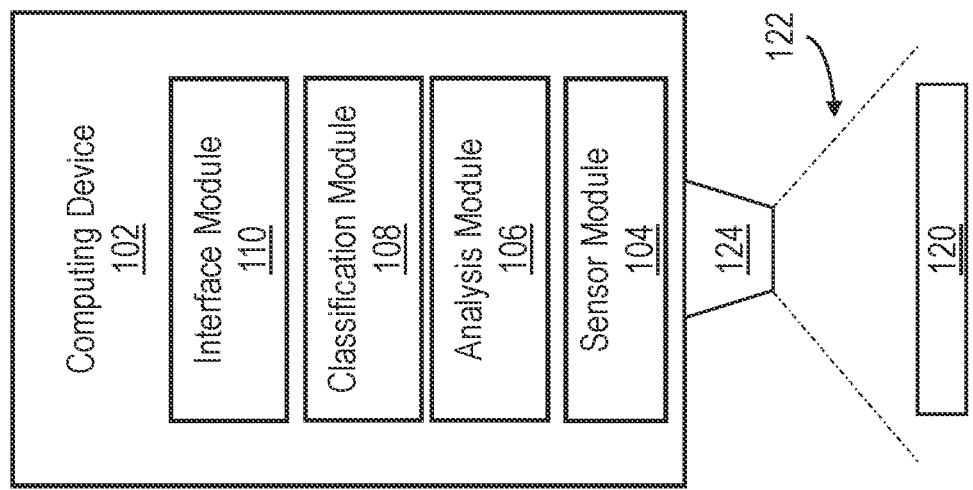
FIG. 1 shows an example system for optical inspection based on a repetitive feature comparison, according to aspects of the disclosure.

Provided herein are system, apparatus, device, method, and/or computer program product embodiments, and/or combinations and sub-combinations thereof for optical inspection based on a repetitive feature comparison. According to some aspects, a computing device (e.g., an inspection device/element, an optical analysis device, a production system component, etc.) and/or the like may use repetitive feature comparison to analyze sensor data, such as a single image, a field-of-view data capture and/or snap-shot, a detection area data capture, and/or the like of a unit under test/inspection to identify and/or classify a functional condition of the unit under test/inspection.

For example, according to some aspects, the computing device may detect instances of a feature of a unit under inspection from an image of the unit, such as all wire bond pads of a Geiger mode photodetector array and/or the like. According to some aspects, a feature may be automatically identified from image data by segmenting the image data, identifying various contours and/or performing contour analysis, and associating identified contours with various features. According to some aspects, a feature may be identified by matching a number of potential features for an object indicated in image data with a number of corresponding/identical contours and identifying the feature based on the match. According to some aspects, an attribute (e.g., a color, a shape, a material, a texture, etc.) identified with and/or common to instances of the feature may be quantified. The computing device may determine a quantified value (e.g., an average, a median, a mode, etc.) of the attribute identified with and/or common to instances of the feature. For example, the computing device may determine a mode of the attribute identified with and/or common to instances of the feature as an RGB coordinate value that appears most for features of a unit under test. According to some aspects, the computing device may determine a quantified value of the attribute identified with and/or common to instances of the feature such as a global average color of all wire bond pads of a Geiger mode photodetector array and/or the like. The computing device may determine any quantified value of the attribute identified with and/or common to instances of the feature.

According to some aspects, the computing device may compare a respective quantified value of an attribute identified with and/or affecting each instance of the feature individually, such as a local average color for each wire bond pad of a Geiger mode photodetector array and/or the like, against the quantified value of the attribute identified with and/or common to each instance of the feature (e.g., the global average color of wire bond pads of a Geiger mode photodetector array, etc.). If the respective quantified value of the attribute identified with and/or affecting an instance of the feature (e.g., a local average color for an individual wire bond pad of a Geiger mode photodetector array, etc.) is greater than the quantified value of the attribute identified with and/or common to each instance of the feature (e.g., the global average color of wire bond pads of a Geiger mode photodetector array, etc.) by a threshold (e.g., a pre-set amount, a specified threshold, etc.), the image of the unit may be modified such that the instance of the feature (e.g., an individual wire bond pad of a Geiger mode photodetector array, etc.) is marked defective and/or a failure. The computing device may repeat the described process for any and every additional feature of interest to determine if the unit under test passes or fails optical inspection.

The system, apparatus, device, method, and/or computer program product embodiments, and/or combinations and sub-combinations thereof for optical inspection based on a repetitive feature comparison, as described herein, facilitate accurate optical inspection and/or device/component classification without the need to prepare a golden sample relative to a unit under inspection or develop a dense dataset (e.g., labeled images, etc.) to train a machine learning model for object detection/classification and/or the like. The system, apparatus, device, method, and/or computer program product embodiments, and/or combinations and sub-combinations thereof for optical inspection based on a repetitive feature comparison facilitate accurate optical inspection for different samples (e.g., units under inspection/test, etc.) from one unit, product, and/or device development run to another without a need to preconfigure and/or prepare a golden sample image for comparison and/or implementing error-prone, time-consuming, and costly machine learning techniques. The system, apparatus, device, method, and/or computer program product embodiments, and/or combinations and sub-combinations thereof for optical inspection based on a repetitive feature comparison may be self-contained and/or applicable to a unit under inspection to account for variations in units from developmental run to run. These and other technological advantages are described herein.

FIG. 1 shows an example system 100 for optical inspection based on a repetitive feature comparison. According to some aspects, the system 100 may include a computing device 102 (e.g., an inspection device, an optical analysis device, a production system component, etc.). The computing device 102 may be a device and/or component implemented in an item, device, and/or product manufacturing process. For example, the computing device 102 may be implemented to perform an automated optical inspection of units (e.g., items, devices, products, etc.) as part of a manufacturing process (e.g., pre-production, post-production, etc.) and/or the like. The computing device 102 may facilitate accurate optical inspection for different units under inspection/test, for example, such as a unit 120. The computing device 102 may facilitate accurate optical inspection for different units under inspection/test from one unit development run to another, without a need to preconfigure and/or prepare a golden sample image for comparison and/or implementing error-prone, time-consuming, and costly machine learning-based unit inspection techniques.

According to some aspects, the unit 120 may be placed and/or positioned within a testing/examining area (not shown). For example, the testing/examining area may include an area/location along a conveyor belt, within a sample load chamber, and/or the like. The testing/examining area may include an adjustable light source to illuminate the unit 120 during test/inspection. The testing/examining area may include a unit holder/clamp to hold and/or steady the unit 120 within a field-of-view 122 (e.g., an area of sensor detection, etc.) of a sensor module 104 included with the computing device 102.

According to some aspects, the sensor module 104 may include various sensing devices, for example, such as cameras (e.g., high-definition cameras, stereo cameras, video cameras, visible spectrum cameras, infrared cameras, etc.). Light Detection and Ranging (LIDAR) sensors, radio detection and ranging (RADAR) sensors, laser detection and ranging (LADAR) sensors, sound navigation and ranging (SONAR) sensors, and/or the like. The sensor module 104 may generate sensor data/information that describes and/or indicates the unit 120 within the field-of-view 122. The field-of-view 122 may correspond to any sensing device of the sensor module 104, such as a camera 124.

According to some aspects, the sensor module 104 may generate image data indicative of the unit 120. In an example scenario, the unit 120 may include a Geiger mode photodetector array (PDA) and/or the like. The sensor module 104 may scan a unit carrying container (e.g., a Gel-PaK®, etc.) containing the unit 120. For example, the sensor module 104 may include a microscope configured with a high-definition camera, and scanning the unit-carrying container may generate image data indicative of the unit carrying container and the unit 120. Image data indicative of the unit carrying container and the unit 120 may be segmented to produce an image of the unit 120 that may be analyzed. According to some aspects, segmenting and analyzing image data indicative of units under test, such as the unit 120, enables inspecting of units such as PDAs that are pre-diced and picked before shipment to a vendor. According to some aspects, segmenting and analyzing image data may be implemented at any stage of a manufacturing and/or distribution process.

According to some aspects, to analyze an image of the unit 120, the computing device 102 may include an analysis module 106. The analysis module 106 may analyze image data (and/or sensor data) indicative of the unit 120, such as a single image (and/or sensed data capture) depicting the unit 120. The analysis module 106, for example, implementing object detection and/or computer vision, may be configured to identify each distinct feature of any object/unit indicated by image data. According to some aspects, the identification of distinct features of an object/unit indicated by image data may be performed indiscriminately, for example, where the analysis module 106 may identify features based on their distinction from other features without a need to be trained to identify a specific feature. For example, the analysis module 106 may analyze image data indicative of the unit 120 and detect each instance and/or occurrence of a feature of the unit 120. Features may include any aspect of a unit under inspection/test. Similarly, the analysis module 106 may detect and/or identify various attributes of features for any unit under test. An attribute may include, for example, a color, a shape, a material, a texture, and/or the like. An attribute may include any aspect of a feature of a unit under inspection/test.

Figure 2A:
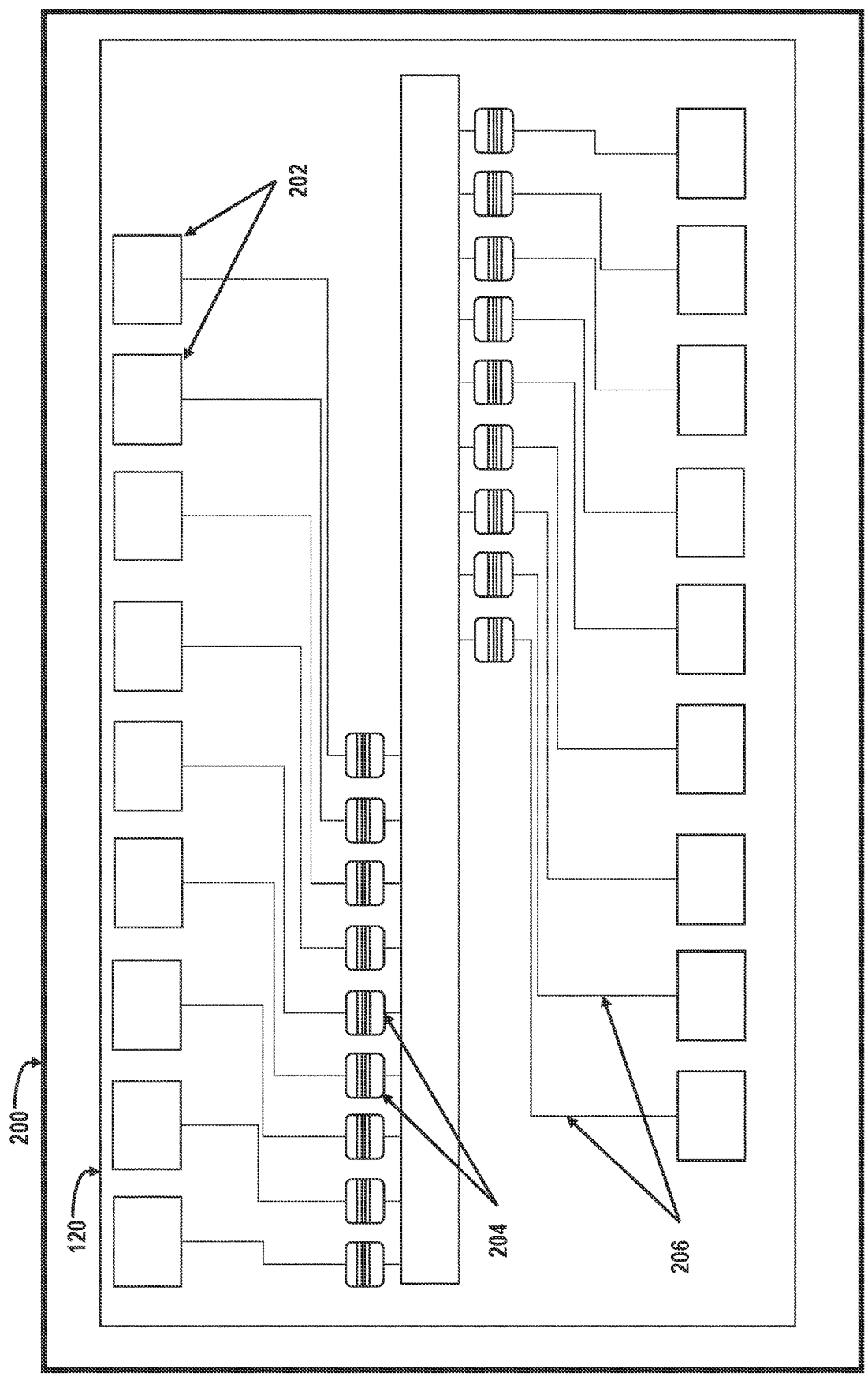
FIG. 2A shows an example of image data used for optical inspection based on a repetitive feature comparison, according to aspects of the disclosure.

According to some aspects, FIG. 2A shows an example image 200 of the unit 120. The image 200 may depict a plurality of features of the unit 120. For example, features of the unit 120 may include electrical traces, electrical components (e.g., resistors, diodes, semiconductors, etc.), wire bond pads, pixels, trenches, and/or a fiducial. For example, as shown at 202, the unit 120 may include a plurality of wire bond pads (features 202), a plurality of resistors (features 204), and a plurality of traces (features 206).

According to some aspects, Algorithm 1 (provided below) may be used/implemented, for example, by the analysis module 106 for optical inspection of the unit 120 based on a repetitive feature comparison.

Algorithm 1

Figure 2B:
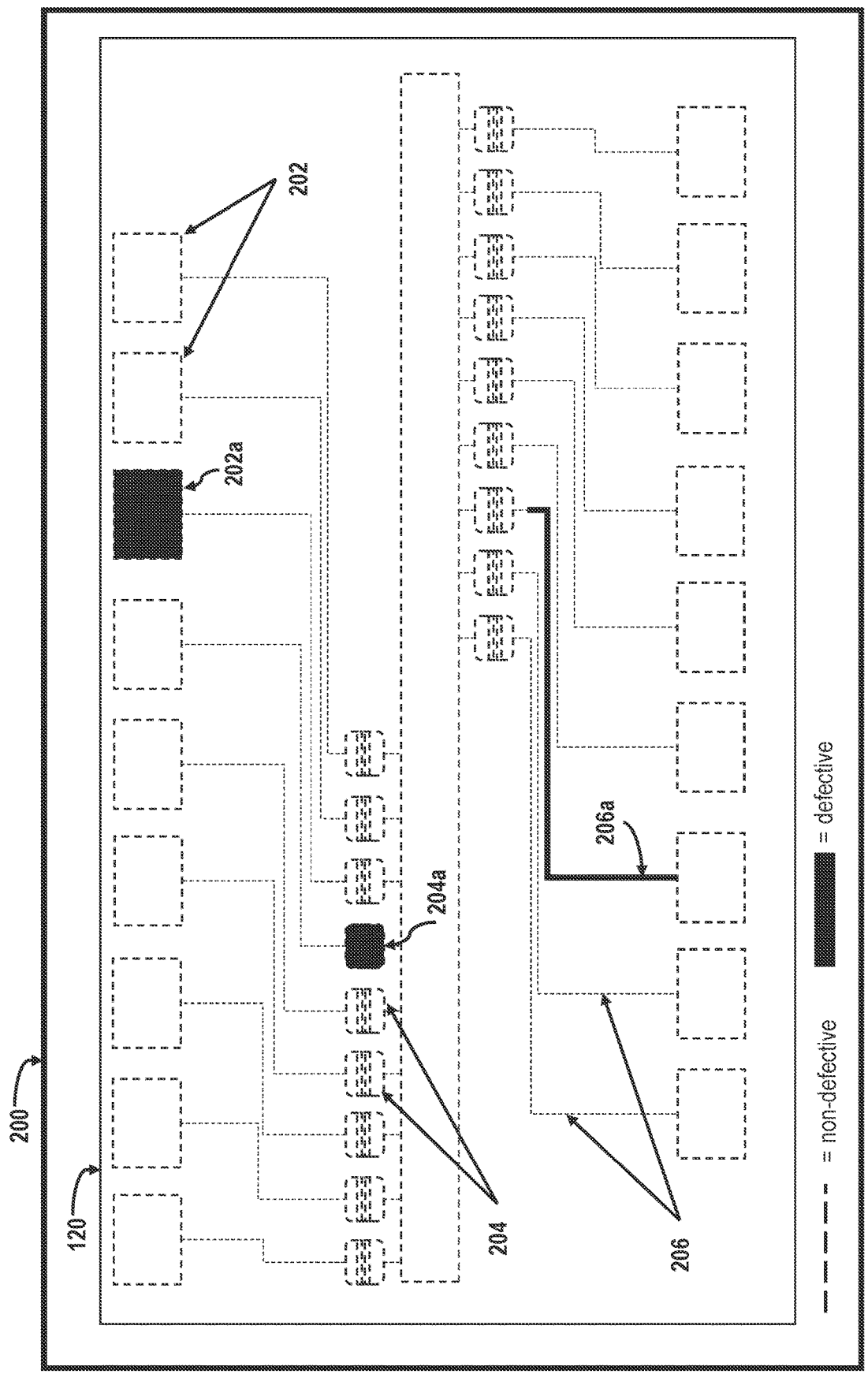
FIG. 2B shows an example of modified image data used for optical inspection based on a repetitive feature comparison, according to aspects of the disclosure.

Algorithm: Feature Comparison
Steps:
1. Select a feature (x) of a unit indicated in image data
2. Identify all instances of the feature (x)
3. Calculate a quantified value for an attribute relative to all instances of the feature (x)
4. Calculate a respective quantified value for an attribute relative to each instance of the feature (x)
5. Compare the respective quantified values for the attribute relative to each instance of the feature (x) to the quantified value for the attribute relative to all instances of the feature (x)
6. Visually mark any instance of the feature (x) that has a respective quantified value for the attribute relative to the instance of the feature (x) that is greater than the quantified value for the attribute relative to all instances of the feature (x) by an acceptance threshold for the feature (x)
7. Repeat steps 1-6 for any/all features of interest According to some aspects, FIG. 2B shows an example of the image 200 modified based on Algorithm 1 (e.g., steps 6-7). According to Algorithm 1, the computing device 102 detects each instance of feature 202 unit, such as all wire bond pads of the unit 120 (e.g. a Geiger mode photodetector array, etc.). The computing device 102 calculates a quantified value (e.g., an average, a median, a mode, etc.) of the attribute identified with and/or common to each instance of the feature, such as a global average color of all instances of feature 202. The computing device 102 compares a respective quantified value of an attribute identified with and/or affecting each instance of feature 202 individually, such as a local average color for each feature 202, against the quantified value of the attribute identified with and/or common to each instance of feature 202. The computing device 102 modifies the image 200 by marking feature 202a as an instance of the feature 202 where the quantified value of the attribute (e.g., a local average color for an individual wire bond pad of unit 120) is greater than the quantified value of the attribute identified with and/or common to each instance of feature 202 (e.g., the global average color of wire bond pads of unit 120) by an acceptance threshold (e.g., a pre-set amount, a specified threshold, etc.). Similarly, the computing device 102 has modified the image 200 to indicate feature 204a as an instance of the feature 204 where a respective quantified value of the attribute (e.g., a local average color for an individual resistor of unit 120) is greater than a quantified value of the attribute identified with and/or common to each instance of feature 204 (e.g., the global average color of resistors of unit 120) by the previous acceptance threshold or a different acceptance threshold, The computing device 102 has modified the image 200 to indicate feature 206a as an instance of the feature 206 where a respective quantified value of the attribute (e.g., a local average color for an individual trace of unit 120) is greater than a quantified value of the attribute identified with and/or common to each instance of feature 206 (e.g., the global average color of traces of unit 120) by the previous acceptance thresholds or a different acceptance threshold.

According to some aspects, the computing device 102 has modified the image 200 to indicate components of the unit 120 that are detective. For example, the computing device 102 has modified the image 200 to indicate, for each of the remaining distinct features of the unit 120, where a respective quantified value of respective attributes of the remaining features is less than, equal to, or not exceeding an acceptance threshold relative to a quantified value of the respective attributes identified with and/or common to each instance of like features.

According to some aspects, the computing device 102 may modify the image 200 (or any other image) to indicate components of a unit under inspection/test (e.g., the unit 120, etc.). Modifying an image may include outlining features and/or components of a unit indicated by the image based on a detected/identified condition, changing a represented color (e.g., RGB color, pixels, etc) of features and/or components of a unit indicated by the image based on a detected/identified condition, generating a grayscale representation of features and/or components of a unit indicated by the image based on a detected/identified condition, and/or the like. According to some aspects, modifying an image may be based on the consideration of attributes such as joint color space (e.g., RGB, YCbCr, YPbPr, CMYK, YIQ, etc.) coordinates of features for defect detection. For example, in the case of an RGB color space, the analysis module 106 may calculate a three-dimensional RGB distance between a feature's RGB coordinates to a global average of RGB coordinates for each instance of the feature. According to some aspects, the analysis module 106 may calculate, determine, and/or identify any color space comparison between features.

According to some aspects, modifying an image may be based on the consideration of attributes such as individual color space coordinates of features for defect detection. For example, using RGB coordinates of features, the analysis module 106 may calculate and compare an R-coordinate for an individual feature to the R-coordinate global average for each instance of the feature, a G-coordinate for an individual feature to the G-coordinate global average for each instance of the feature, and a B-coordinate for an individual feature to the B-coordinate global average for each instance of the feature.

According to some aspects, for features of a unit under test, the analysis module 106 may use a subset of color space (or any other attribute) coordinates for comparison. For example, for a feature such as a resistor of a PDA the analysis module 106 may use R-coordinates for comparison, and for another feature the analysis module 106 may use G-coordinates for comparison. According to some aspects, the analysis module 106 may use any subset, combination, and/or subcombination of color space coordinates for comparison (e.g., only use B-coordinates, only use R+G coordinates, only use grayscale, etc.)

According to some aspects, in a situation/scenario where a comparison for features based on a color space fails, the analysis module 106 may use different attributes of features of a unit under inspection/test (e.g., the unit 120, etc.) for comparison. According to some aspects, the analysis module 106 may identify other attributes including, but not limited to, shapes of features, material, texture, and/or the like. For example, the analysis module 106 may identify a shape of an individual feature and compare it to an average shape for each instance of the feature as part of a defect detection process.

According to some aspects, the computing device 102 (e.g., the analysis module 106, etc.) may perform and/or implement any image modification technique to indicate conditions for features of a unit under inspection/test.

Returning to FIG. 1, according to some aspects, the computing device 102 may identify and/or suggest a condition of a feature of a unit e.g., the unit 120, etc.) under inspection/test based on modified image data. For example, the computing device 102 may include a classification module 108. The classification module 108 may classify a condition (e.g., defective, non-defective, etc.) of a feature(s) of a unit (e.g., the unit 120, etc.) under inspection/test based on modified image data. According to some aspects, the classification module 108 may use/implement inference logic to classify a condition of a feature of a unit (e.g., the unit 120, etc.) under inspection/test based on modified image data. For example, the classification module 108 may infer that a threshold percentage of features marked the same and/or similar to each other according to modified image data may indicate that the features (e.g., such as remaining features of unit 120, etc.) are non-defective and the classification module 108 may generate an indication as such. The classification module 108 may infer that features marked differently than a threshold percentage of features marked the same and/or similar to each other according to modified image data may indicate that the features are defective and the classification module 108 may generate an indication as such. For example, the instances of features 202a, 204a, and 206a of FIG. 2B may indicate components of the unit 120 that are defective.

According to some aspects, the computing device 102 may display image data and/or modified image data, and a user may identify a condition for marked features. For example, the computing device may include an interface module 110. The interface module 110 may be any interface for presenting and/or receiving information to/from a user, such as image data (and/or sensor data), modified image data (and/or modified sensor data), and/or the like. The interface module 110 may include a graphical user interface (GUI) and/or a communication interface such as a web browser (e.g., Microsoft Internet Explorer®, Mozilla Firefox®, Google Chrome®, Apple Safari®, etc.). Other software, hardware, and/or interfaces may be used to provide communication between the computing device 102 and a user, other computing devices 102, and/or any other device (e.g., smart devices, mobile devices, computing systems, unit analysis and/or management systems, etc.)

According to some aspects, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components of the interface module 110 may enable a user to select and/or indicate features of interest for a unit under test/inspection. According to some aspects, interaction with the input devices and/or components of the interface module 110 may enable a user to classify the functionality (e.g., defective, non-defective, etc.) of marked features of a unit under inspection/test indicated in an image.

For example, according to some aspects, the computing device 102 may generate a report and/or cause display of modified image data for user defect inspection review. According to some aspects, a report may be generated, and/or modified image data may be displayed for review via the interface module 110 (and/or a device/interface in communication with the computing device 102), in situations when image data cannot and/or does not indicate and/or identify features that are not clear passes (e.g., non-defective) and/or not clear fails (e.g., non-defective). For example, the interface module 110 may display the image 200 of FIGS. 2A-2B and interaction with the input devices and/or components of the interface module 110 may enable the features 202a, 202b, 204a, and 206a of FIG. 2B to be classified as defective and/or remaining features of the unit 120 to be classified as non-defective and/or the like. According to some aspects, a unit under test that passes optical inspection (e.g., a PDA that passes inspection, etc.) may be classified as a product qualified for delivery, may progress in the next step of a product assembly and/or manufacturing process, may be used as a model unit for other units under test, and/or the like. According to some aspects, a unit under test that fails optical inspection (e.g., a PDA that fails inspection, etc.) may be discarded, stored separately from other units under test, sent for repair, and/or the like.

Figure 3:
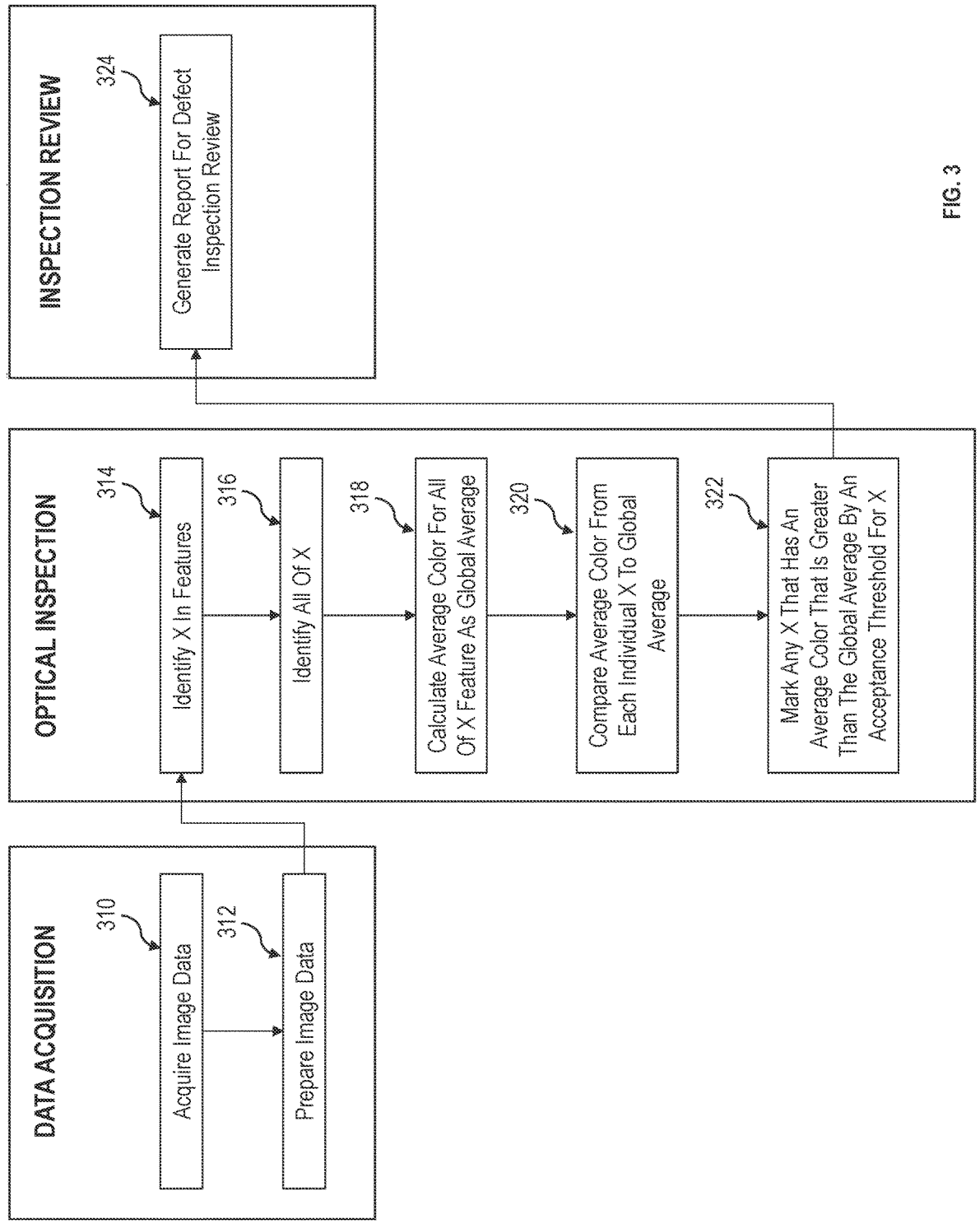
FIG. 3 shows a flowchart of an example method for optical inspection based on a repetitive feature comparison, according to aspects of the disclosure.

FIG. 3 shows a flowchart of an example method 300 for optical inspection based on a repetitive feature comparison, according to some aspects. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1, 2A, and 2B. However, method 300 is not limited to the aspects of those figures. Method 300 refers to an example scenario where a unit under test includes a device such as a Geiger mode PDA and/or the like and uses color space comparison between features of the unit under test to identify defective components. According to some aspects, the method 300 may be used for any unit under test and may use any attribute of features for comparison to identify defective components. Method 300 may include steps associated with data acquisition, optical inspection, and inspection review. For example, as shown in FIG. 3, steps 310-312 may be associated with data acquisition, steps 314-322 may be associated with optical inspection, and step 324 may be associated with inspection review.

In 310, image data indicative of a unit under test may be acquired and/or generated. For example, a unit (e.g., the unit 120, etc.) under test may include a Geiger mode photodetector array (PDA) and/or the like. A microscope, a high-definition camera, and/or any other imaging device (e.g., the sensor module 104, etc.) may scan a unit carrying container (e.g., a Gel-PaK®, etc.) containing the unit under test. Scanning the unit-carrying container may generate image data indicative of the unit carrying container and the unit under test.

In 312, image data indicative of a unit under test may be prepared for analysis. For example, image data indicative of the unit carrying container and the unit under test may be segmented to produce an image of the unit under test that may be analyzed. According to some aspects, segmenting and analyzing image data indicative of units under test enables inspecting of units such as PDAs that are pre-diced and picked before shipment to a vendor. According to some aspects, segmenting and analyzing image data may be implemented at any stage of a manufacturing and/or distribution process.

In 314, an element (x) of a feature (e.g., features 202-206, etc.) of the unit under test may be identified from the segmented image data. Features may include any component of the unit under test including, but not limited to, traces, resistors, pads, pixels, trenches, fiducials, and/or the like. According to some aspects, a feature may be identified (e.g., automatically identified) from segmented image data. According to some aspects, a certain number of identified contours with similar attributes (e.g., size, shape, etc.) may be indicative of a feature for an object under test. For example, a most-occurring contour of a plurality of contours indicated by image data may be identified. Various contours and/or contour types may be identified, for example, by segmenting the image data and performing contour detection. For example, contour detection may involve identifying border pixels in image data that are distinct from the background forming an enclosed, continuous path of pixels that form a line representing a contour of an object indicated in image data. A feature in image data may be identified as being associated with a most-occurring contour, for example, within the segmented image data. As described, the feature may be identified by identifying a particular contour type, a contour shape, and/or any other contour-related aspect in image data and associating the particular contour type, contour shape, and/or any other contour-related aspect in the image data with the feature.

According to some aspects, a feature may be identified from the image data based on feature identification information. For example, an analytics model (e.g., the analysis module 106, etc.) and/or analysis device (e.g., the computing device 102, etc.) may receive feature identification information that indicates an amount for a feature (e.g., a predicted occurrence of a feature, etc.). For example, if an object under inspection is an array, feature identification information may indicate that the array has a certain amount of features (e.g., 514 resistors, 25 wiring pads, etc.). An amount of a contour type (and/or matching contours) indicated by image data may be identified, A feature may be identified based on the amount of the contour type (and/or matching contours) indicated by the image data matching the amount for the feature. For example, if an object under test is a photodetector array known to include 514 resistors, an analytics model (e.g., the analysis module 106, etc.) and/or analysis device (e.g., the computing device 102, etc.) may identify the feature of resistors from image data depicting the photodetector array by identifying 514 identical (and/or approximately identical) shapes indicated by the image data.

In 316, all instances of the element (x) for the unit under test may be identified. For example, an analytics model (e.g., the analysis module 106, etc.) and/or analysis device (e.g., the computing device 102, etc.) performing object detection and/or the like may identify all instances of the element (x) for the unit under test from the segmented image data (e.g., a single image of the unit under test, etc.).

In 318, an average color for all instances of the element (x) for the unit under test may be calculated. For example, the analytics model and/or analysis device may calculate the average color for all instances of the element (x) for the unit under test. The resulting value from the calculations may represent a global average for the element (x).

In 320, an average color for each instance of the element (x) for the unit under test may be compared to the global average for the element (x). For example, the analytics model and/or analysis device may calculate the average color for each instance of the element (x) for the unit under test. The resulting values from the calculations may each be compared to the global average for the element (x).

In 322, the image data (e.g., image 200 of FIG. 2B, etc.) may be modified (e.g., visually marked, etc.) to indicate any instance of the element (x) that an average color that is greater than the global average for the element (x) by an acceptance threshold for the element (x).

In 324, a report for defect inspection for the unit under test may be generated. According to some aspects, the report may include the modified image data, and the modified image data may be reviewed by a user to determine if the unit under test is defective. For example, any portion of the modified image data that has been modified relative to the original image data may suggest an outlier condition for the associated feature. For example, a suggested outlier condition may include an indication of a potentially failed and/or potentially defective feature of the unit under test. A user interface may be used to review the suggested outlier conditions, and an interactive element (e.g., a mouse, a keyboard, a tactile device, etc.) may be used to provide and/or select classifications (e.g., defective, non-defective, pass, fail, etc.) for the suggested outlier conditions.

Figure 4:
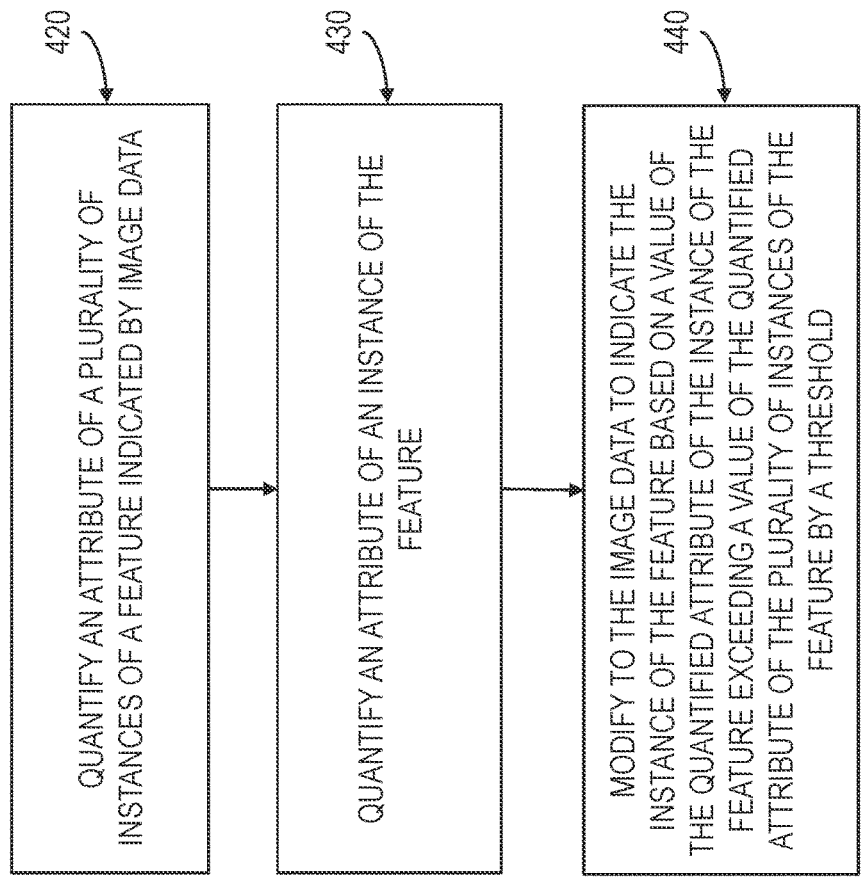
FIG. 4 shows a flowchart of an example method for optical inspection based on a repetitive feature comparison, according to aspects of the disclosure.

FIG. 4 shows a flowchart of an example method 400 for optical inspection based on a repetitive feature comparison, according to some aspects. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIGS. 1-3. However, method 400 is not limited to the aspects of those figures. The computing device 102 may facilitate optical inspection based on a repetitive feature comparison.

In 420, computing device 102 quantifies, based on a plurality of instances of the feature indicated by image data, an attribute of the plurality of instances of the feature. According to some aspects, the feature may include, for example, an electrical trace of a device, an electrical component of the device, a wire bond pad of the device, a pixel of the device, a trench of the device, a fiducial of the device, and/or the like. The feature may be any feature indicated in the image data.

The attribute of the plurality of instances of the feature may include, for example, a color indicated by the plurality of instances of the feature, a shape indicated by the plurality of instances of the feature, a material indicated by the plurality of instances of the feature, a texture indicated by the plurality of instances of the feature, and/or the like.

According to some aspects, computing device 102 identifies (e.g., automatically identifies, etc.) the feature from the image data. For example, computing device 102 may identify a most-occurring contour of a plurality of contours indicated by the image data. Various contours and/or contour types may be identified, for example, by segmenting the image data and performing contour detection (e.g., identifying border pixels in image data that are distinct from the background forming an enclosed, continuous path of pixels that form a line representing a contour of an object, etc.). The computing device 102 may identify the feature as being indicated by the most-occurring contour, for example, within segmented image data. According to some aspects, the feature may be identified by identifying a particular contour type, a contour shape, and/or any other contour-related aspect in image data.

According to some aspects, computing device 102 identifies the feature from the image data based on feature identification information. For example, computing device 102 may receive feature identification information that indicates an amount for the feature. For example, if an object under inspection is an array, feature identification information may indicate that the array has a certain amount of features (e.g., 514 resistors, 25 wiring pads, etc.). Computing device 102 may identify an amount of matching contours indicated by the image data. Computing device 102 may identify the feature based on the amount of matching contours indicated by the image data matching the amount for the feature.

In 430, computing device 102 quantifies the attribute for an instance of the feature from the plurality of instances of the feature. The quantified attribute may include, for example, a color indicated by the instance of the feature, a shape indicated by the instance of the feature, a material indicated by the instance of the feature, a texture indicated by the instance of the feature, and/or the like. According to some aspects, the attribute (e.g., the unquantified attribute, the quantified attribute, etc.) matches the attribute (e.g., the unquantified attribute, the quantified attribute, etc.) of the plurality of instances of the feature.

In 440, computing device 102 modifies the image data to indicate the instance of the feature. For example, computing device 102 may modify the image data to indicate the instance of the feature based on a value of the quantified attribute of the instance of the feature exceeding a value of the quantified attribute of the plurality of instances of the feature by a threshold. Modifying the image data may include, for example, changing a color of pixels of the image data that are associated with the instance of the feature.

According to some aspects, the method 300 may further include classifying a functionality of a device (and/or a feature/component of the device) indicated by the image data. For example, the functionality of the device indicated by the image data may be classified based on the modified image data. According to some aspects, the computing device 102 may classify functionality of the device indicated by the image data based on the modified image data. According to some aspects, the computing device 102 may cause display of the modified image data, and functionality of the device indicated by the image data may be classified based on an interaction with an interactive element displayed with the modified image data. According to some aspects, computing device 102 may send the modified image data to a user device. Computing device 102 may receive functionality information for a device indicated by the image data, for example, from the user device, based on the modified image data.

According to some aspects, the method 400 may further include the computing device 102 receiving an indication of a plurality of additional features, for example, indicated in the image data. For example, according to some aspects, the plurality of additional features may be selected via interaction with an interactive element displayed via a display device associated with and/or in communication with the computing device 102.

According to some aspects, for each additional feature of the plurality of additional features, computing device 102 modifies the image data further to indicate each instance of the additional feature with a value of a respective quantified attribute of the additional feature that exceeds a value of a quantified attribute of a plurality of instances of the additional feature by the threshold. The functionality of the device indicated by the image data may be further classified based on the further modified image data.

According to some aspects, computing device 102 may adjust the threshold. For example, computing device 102 may adjust the threshold based on a type of another feature indicated by the image data. According to some aspects, computing device 102 may adjust the threshold based on user preference information, for example, received via the interface module 110, a user device, combinations thereof, and/or the like.

Figure 5:
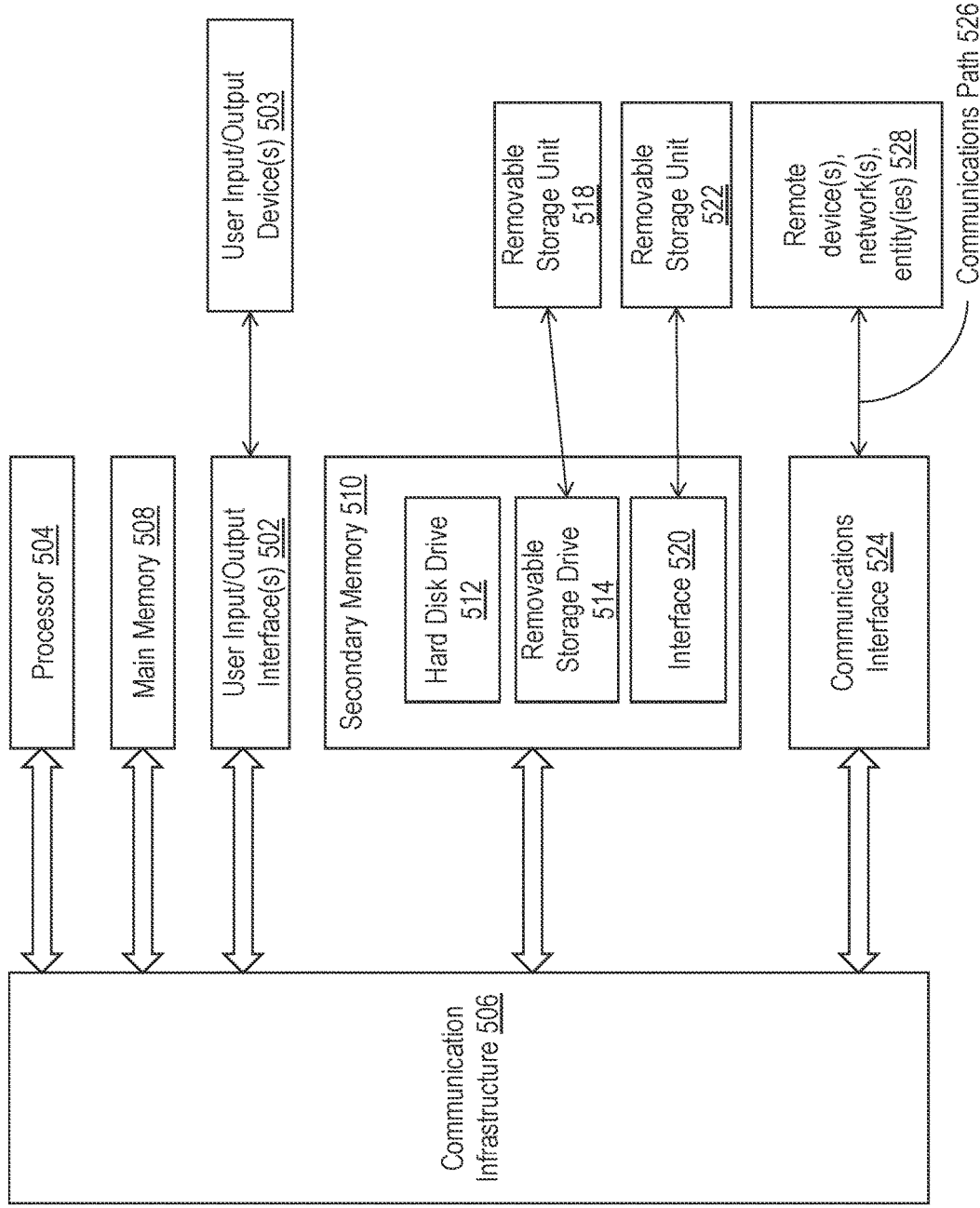
FIG. 5 is an example computer system useful for implementing various aspects of the disclosure.

Various embodiments can be implemented, for example, using one or more computer systems, such as computer system 500 shown in FIG. 5. Computer system 500 can be any computer capable of performing the functions described herein.

Computer system 500 can be any well-known computer capable of performing the functions described herein. According to some aspects, the computing device 102 of FIG. 1 (and/or any other device/component described herein) may be implemented using the computer system 500. According to some aspects, the computer system 500 may be used and/or specifically configured to implement method 400.

Computer system 500 includes one or more processors (also called central processing units, or CPUs), such as a processor 504. Processor 504 is connected to a communication infrastructure (and/or bus) 506.

One or more processors 504 may each be a graphics processing unit (CPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 may include one or more levels of cache. Main memory 508 has stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. Removable storage unit 518 includes a computer-usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to an exemplary embodiment, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for automated inspection comprising:
    scanning, by a sensor module, at least one unit under test;
    generating, by the sensor module, image data indicative of the at least one unit;
    identifying a feature based on a most-occurring contour of a plurality of contours indicated by the image data;
    quantifying, based on a plurality of instances of the feature, an attribute of the plurality of instances of the feature;
    quantifying an attribute of an instance of the feature of the plurality of instances of the feature, wherein the attribute of the instance of the feature matches the attribute of the plurality of instances of the feature; and
    modifying, based on a value of the quantified attribute of the instance of the feature exceeding a value of the quantified attribute of the plurality of instances of the feature by a threshold, the image data to indicate the instance of the feature.

2. The computer-implemented method of claim 1, further comprising:
    identifying the feature based on an amount for the feature indicated by feature identification matching an amount of a contour type in the image data.

3. The method of claim 1, wherein the attribute of the plurality of instances of the feature comprises at least one of a color indicated by the plurality of instances of the feature, a shape indicated by the plurality of instances of the feature, a material indicated by the plurality of instances of the feature, or a texture indicated by the plurality of instances of the feature.

4. The method of claim 1, further comprising classifying, based on the modified image data, functionality of a device indicated by the image data.

5. The method of claim 1, further comprising, for each additional feature of a plurality of additional features:
    modifying the image data further to indicate each instance of the additional feature with a value of a respective quantified attribute of the additional feature that exceeds a value of a quantified attribute of a plurality of instances of the additional feature by the threshold; and classifying, based on the modified image data, functionality of a device indicated by the image data.

6. The method of claim 1, further comprising:
sending, to a user device, the modified image data; and
receiving, based on the modified image data, functionality information for a device indicated by the image data.

7. A non-transitory computer-readable medium having instructions stored thereon that, when executed by at least one computing device, cause the at least one computing device to perform operations for automated inspection comprising:

scanning, by a sensor module, at least one unit under test;
generating, by the sensor module, image data indicative of the at least one unit;
identifying a feature based on a most-occurring contour of a plurality of contours indicated by the image data;
quantifying, based on a plurality of instances of the feature, an attribute of the plurality of instances of the feature;
quantifying an attribute of an instance of the feature of the plurality of instances of the feature, wherein the attribute of the instance of the feature matches the attribute of the plurality of instances of the feature; and
modifying, based on a value of the quantified attribute of the instance of the feature exceeding a value of the quantified attribute of the plurality of instances of the feature by a threshold, the image data to indicate the instance of the feature.

8. The non-transitory computer-readable medium of claim 7, wherein the instructions further cause the at least one computing device to perform the operation of:
identifying the feature based on an amount for the feature indicated by feature identification matching an amount of a contour type in the image data.

9. The non-transitory computer-readable medium of claim 7, wherein the attribute of the plurality of instances of the feature comprises at least one of a color indicated by the plurality of instances of the feature, a shape indicated by the plurality of instances of the feature, a material indicated by the plurality of instances of the feature, or a texture indicated by the plurality of instances of the feature.

10. The non-transitory computer-readable medium of claim 7, wherein the instructions further cause the at least one computing device to perform the operation of:
classifying, based on the modified image data, functionality of a device indicated by the image data.

11. The non-transitory computer-readable medium of claim 7, wherein the instructions further cause the at least one computing device to perform the operation of, for each additional feature of a plurality of additional features:
modifying the image data further to indicate each instance of the additional feature with a value of a respective quantified attribute of the additional feature that exceeds a value of a quantified attribute of a plurality of instances of the additional feature by the threshold; and
classifying, based on the modified image data, functionality of a device indicated by the image data.

12. The non-transitory computer-readable medium of claim 7, wherein the instructions further cause the at least one computing device to perform the operation of:
sending, to a user device, the modified image data; and
receiving, based on the modified image data, functionality information for a device indicated by the image data.

13. A computing system for automated inspection comprising:
a memory configured to store instructions;
a processor, coupled to the memory, configured to process the stored instructions to perform operations comprising:
scanning, by a sensor module, at least one unit under test;
generating, by the sensor module, image data indicative of the at least one unit;
identifying a feature based on a most-occurring contour of a plurality of contours indicated by the image data;
quantifying, based on a plurality of instances of the feature, an attribute of the plurality of instances of the feature;
quantifying an attribute of an instance of the feature of the plurality of instances of the feature, wherein the attribute of the instance of the feature matches the attribute of the plurality of instances of the feature; and
modifying, based on a value of the quantified attribute of the instance of the feature exceeding a value of the quantified attribute of the plurality of instances of the feature by a threshold, the image data to indicate the instance of the feature.

14. The computing system of claim 13, wherein the instructions further cause the processor to further perform the operation of:
identifying the feature based on an amount for the feature indicated by feature identification matching an amount of a contour type in the image data.

15. The computing system of claim 13, wherein the attribute of the plurality of instances of the feature comprises at least one of a color indicated by the plurality of instances of the feature, a shape indicated by the plurality of instances of the feature, a material indicated by the plurality of instances of the feature, or a texture indicated by the plurality of instances of the feature.

16. The computing system of claim 13, wherein the instructions further cause the processor to further perform the operation of:
classifying, based on the modified image data, functionality of a device indicated by the image data.

17. The computing system of claim 13, wherein the instructions further cause the processor to further perform the operation of, for each additional feature of a plurality of additional features:
modifying the image data further to indicate each instance of the additional feature with a value of a respective quantified attribute of the additional feature that exceeds a value of a quantified attribute of a plurality of instances of the additional feature by the threshold; and
classifying, based on the modified image data, functionality of a device indicated by the image data.

* * * * *